(12) United States Patent
Du et al.

(10) Patent No.: US 10,053,547 B2
(45) Date of Patent: Aug. 21, 2018

(54) THERMOSETTING RESIN COMPOSITION AND USES THEREOF

(71) Applicant: SHENGYI TECHNOLOGY CO., LTD., Dongguan (CN)

(72) Inventors: Cuiming Du, Dongguan (CN); Songgang Chai, Dongguan (CN)

(73) Assignee: SHENGYI TECHNOLOGY CO., LTD. (CN)

( * ) Notice: Subject to any disclaimer, the term of this patent is extended or adjusted under 35 U.S.C. 154(b) by 125 days.

(21) Appl. No.: 15/033,299

(22) PCT Filed: Nov. 6, 2013

(86) PCT No.: PCT/CN2013/086617
§ 371 (c)(1),
(2) Date: Apr. 29, 2016

(87) PCT Pub. No.: WO2015/062115
PCT Pub. Date: May 7, 2015

(65) Prior Publication Data
US 2016/0264745 A1 Sep. 15, 2016

(30) Foreign Application Priority Data

Oct. 29, 2013 (CN) .......................... 2013 1 0526318

(51) Int. Cl.
| C08K 5/5398 | (2006.01) |
| C08K 3/30 | (2006.01) |
| C08K 3/08 | (2006.01) |
| C08J 5/24 | (2006.01) |
| C08K 3/11 | (2018.01) |
| C08K 3/013 | (2018.01) |
| C08K 3/01 | (2018.01) |
| C08L 63/00 | (2006.01) |
| C08G 59/00 | (2006.01) |
| B32B 7/12 | (2006.01) |
| C08K 3/34 | (2006.01) |
| C08K 3/40 | (2006.01) |
| C08K 3/26 | (2006.01) |
| C08K 3/38 | (2006.01) |
| C08L 101/00 | (2006.01) |
| C08K 3/36 | (2006.01) |
| C08K 3/16 | (2006.01) |
| C08K 3/22 | (2006.01) |
| C08K 3/24 | (2006.01) |
| C08K 7/22 | (2006.01) |
| C08K 5/56 | (2006.01) |

(Continued)

(52) U.S. Cl.
CPC ...... *C08J 5/24* (2013.01); *B32B 7/12* (2013.01); *C08G 59/4021* (2013.01); *C08G 59/686* (2013.01); *C08K 3/01* (2018.01); *C08K 3/013* (2018.01); *C08K 3/11* (2018.01); *C08K 3/16* (2013.01); *C08K 3/22* (2013.01); *C08K 3/24* (2013.01); *C08K 3/26* (2013.01); *C08K 3/30* (2013.01); *C08K 3/34* (2013.01); *C08K 3/36* (2013.01); *C08K 3/38* (2013.01); *C08K 3/40* (2013.01); *C08K 5/0091* (2013.01); *C08K 5/057* (2013.01); *C08K 5/39* (2013.01); *C08K 5/5398* (2013.01); *C08K 5/56* (2013.01); *C08K 7/22* (2013.01); *C08L 63/00* (2013.01); *C08L 101/00* (2013.01); *B32B 2260/046* (2013.01); *B32B 2264/102* (2013.01); *B32B 2264/104* (2013.01); *B32B 2307/306* (2013.01); *B32B 2307/71* (2013.01); *B32B 2307/714* (2013.01); *C08J 2363/00* (2013.01); *C08J 2363/02* (2013.01); *C08K 2003/0887* (2013.01); *C08K 2003/2227* (2013.01); *C08K 2003/3009* (2013.01)

(58) Field of Classification Search
CPC .... C08K 5/56; C08K 3/26; C08K 3/16; C08K 3/22; C08K 3/24; C08K 7/22; C08K 3/30; C08K 3/34; C08K 3/36; C08K 3/38; C08K 3/40; C08K 2003/2227; C08K 2003/03; B32B 7/12; B32B 2260/046; B32B 2261/102; B32B 2307/714; B32B 2307/71; B32B 2307/306; B32B 2264/104; C08L 101/00; C08J 2363/02; C08J 2363/00
See application file for complete search history.

(56) References Cited

U.S. PATENT DOCUMENTS 3,819,592 A * 6/1974 Visser .................. C08F 210/00
  526/113
4,560,716 A * 12/1985 Sato ........................ C08K 5/39
  523/451

FOREIGN PATENT DOCUMENTS

| CN | 1705110 A | 12/2005 |
| CN | 101463181 A | 6/2009 |

(Continued)

OTHER PUBLICATIONS

ISA/CN, International Search Report and Written Opinion prepared for PCT/CN2013/086617 dated Aug. 11, 2014.

Primary Examiner — Randy P Gulakowski
Assistant Examiner — Ha S Nguyen
(74) Attorney, Agent, or Firm — McDonald Hopkins LLC

(57) ABSTRACT

The present invention relates to a thermosetting resin composition. The composition comprises from about 20 wt. % to about 70 wt. % of a thermosetting resin, from about 1 wt. % to about 30 wt. % of a curing agent, from about 0 wt. % to about 10 wt. % of an accelerant, a tungsten compound, and an inorganic filler. A prepreg may be prepared in an impregnation manner or a coating product may be prepared in a coating manner. The composition may decrease the thermal expansion coefficient of laminates and may effectively block UV light and decrease the light transmissivity.

19 Claims, No Drawings

(51) Int. Cl.
*C08G 59/40* (2006.01)
*C08G 59/68* (2006.01)
*C08K 5/00* (2006.01)
*C08K 5/057* (2006.01)
*C08K 5/39* (2006.01)

(56) References Cited

FOREIGN PATENT DOCUMENTS

| | | | | |
|---|---|---|---|---|
| CN | 101851390 | A | | 10/2010 |
| CN | 102190865 | A | | 9/2011 |
| JP | 10212396 | A | | 8/1998 |
| JP | H10212396 | A | | 8/1998 |
| JP | 2002367869 | A | | 12/2002 |
| JP | 2004500470 | A | | 1/2004 |
| JP | 2008179724 | A | | 8/2008 |
| JP | 2009138075 | A | * | 6/2009 |
| JP | 201213441 | A | * | 7/2012 |
| JP | 2012134411 | A | | 7/2012 |

* cited by examiner

THERMOSETTING RESIN COMPOSITION AND USES THEREOF

CROSS REFERENCE TO RELATED APPLICATIONS

This application is a 35 U.S.C. 371 national stage filing and claims priority to International Application No. PCT/CN2013/086617 filed on Nov. 6, 2013, entitled "THERMOSETTING RESIN COMPOSITION AND USES THEREOF," which claims the benefit of Chinese Patent Application No. 201310526318.9 filed on Oct. 29, 2013 each of which is incorporated herein in its entirety by reference.

BRIEF SUMMARY OF THE INVENTION

The present invention relates to a thermosetting resin composition and uses thereof, and specifically relates to a thermosetting resin composition, as well as a prepreg and a laminate prepared from the thermosetting resin composition.

BACKGROUND OF THE INVENTION

With the development of electronic products in the direction of miniaturization, multi-functionalization, high performance and high reliability, printed circuit boards are developed rapidly in the direction of high precision, high density, high performance, microporation, thinning tendency, and multiple stratification. The application scope has become wider and ranges from industrial large-scale computers, communication instruments, electronic measurements, national defenses, aviation, and aerospace to civilian electronics and related products. The matrix material largely determines the performance of printed circuit boards, so there is a need to develop a new generation of matrix materials. The new generation of future matrix material should have high heat resistance, low thermal expansion coefficient, and excellent chemical stability and mechanical performance.

In order to decrease the thermal expansion coefficient of the laminates, the general method is to use the resins having a low thermal expansion coefficient or to increase the content of the inorganic filler. However, the resins having a low thermal expansion coefficient have a relatively special structure and a higher cost. To increase the content of the inorganic filler may not only effectively decrease the thermal expansion coefficient of the complexes, but also greatly reduce the cost. Highly-filled resins will decrease drilling processability of the laminates. Massive fillers, such as talc, etc., are added as a lubricant to improve processability, but are ineffective. Moreover, the addition of massive fillers further deteriorates the adhesive force between the layers.

In recent years, LED (light emitting diode) has been widely applied in the fields of electric appliance indications, LED panels, LED backlight, landscape lighting, interior decoration and the like, due to the prominent features, such as low energy consumption, high efficiency and the like. High-speed development of LED also drives the developments of functional copper-clad laminate and cover film. Besides insulation, the copper-clad laminate and cover film need to have better shading function, so as to avoid penetration of light of LED light sources from the back of boards, energy waste and decrease of radiance. In order to endow the copper-clad laminate and cover film with black characteristics, materials, such as carbon black, aniline black, and the like, are commonly added into the copper-clad laminate in the industry and cover film to endow the boards with black functions.

CN102190865A discloses an epoxy resin composition for manufacturing copper-clad laminates, and mainly relates to endow copper-clad laminates with black characteristics by means of aniline black. CN101851390A discloses a black cover film, and mainly relates to endow cover film with black characteristics by means of carbon black powder. However, black pigments often bring various problems. The black pigment carbon black mainly containing carbon will prominently affect the insulating property of copper-clad laminate and cover film, and the black pigment aniline black consisting of benzene ring and nitrogen will affect the heat resistance property of copper-clad laminate, especially halogen-containing copper-clad laminate and cover film.

DETAILED DESCRIPTION OF THE INVENTION

As to the problem in the prior arts, one of the objectives of the present invention is to provide a thermosetting resin composition. The thermosetting resin composition, even if highly-filled with inorganic fillers, may also inhibit the deteriorations of the drilling processability and the interstratified adhesive force. The laminates using the thermosetting resin composition have low thermal expansion coefficient, excellent drilling processability and heat resistance, high interstratified adhesive force, excellent mechanical performance, and chemical stability.

In order to achieve the aforesaid objective, the present invention uses the following technical solution:

a thermosetting resin composition, comprising a thermosetting resin, an inorganic filler, and a tungsten compound.

The additions of tungsten compounds and inorganic fillers into the thermosetting resin of the present invention may not only decrease the thermal expansion coefficient of the laminates, increase the mechanical performance of the laminates and enhance the drilling processability of the laminates, but may also prominently improve the compatibility between the thermosetting resin and inorganic fillers, as well as the interlayer adhesive force of the laminates. Thus even highly-filled with inorganic fillers, the thermosetting resin composition may also inhibit the deteriorations of the drilling processability and the interstratified adhesive force. The resultant laminates have low thermal expansion coefficient, excellent drilling processability and heat resistance, high interlayer adhesive force, and excellent mechanical performance and chemical stability. Moreover, the thermosetting resins added with tungsten compounds are suitable for the manufacturing process of any laminate and PCB, and the formula and process improvement are easy to carry out.

Since tungsten compounds have a low friction coefficient and a better lubricity, the thermosetting resin compositions with added tungsten compounds have a reduction of abrasion to drilling tool.

Preferably, the tungsten compound is selected form the group consisting of organic tungsten compounds or/and inorganic tungsten compounds.

Preferably, the tungsten compound is selected from the group consisting of tungsten disulfide, ammonium tetrathiotungstate, tungsten oxytetrabromide, tungsten tetrachloride, tungsten tetrabromide, zinc tungstate, calcium tungstate, magnesium tungstate, ammonium tungstate, tungsten selenide, tungsten oxide, tungsten dioctyl dithiocarbamate, tungsten dithiolate, 3,4-dimercapto-toluene-co-tungsten, amine tungsten diisopropyl phosphorodithioate, organic tungsten and molybdenum complexes, tungsten dithiocarbamate compound, aromatic tungsten compound or amine tungsten alkyl(aryl)phosphorothioate, or a mixture of at least two selected therefrom. The mixture is selected from the group consisting of, e.g., a mixture of tungsten disulfide and ammonium tetrathiotungstate, a mixture of tungsten oxytetrabromide and tungsten tetrachloride, a mixture of tungsten tetrabromide and zinc tungstate, a mixture of calcium tungstate and magnesium tungstate, a mixture of ammonium tungstate and tungsten selenide, a mixture of tungsten oxide and tungsten dioctyl dithiocarbamate, a mixture of tungsten dithiolate and 3,4-dimercapto-toluene-co-tungsten, a mixture of amine tungsten diisopropyl phosphorodithioate and organic tungsten and molybdenum complexes, a mixture of tungsten dithiocarbamate compound, aromatic tungsten compound and amine tungsten alkyl(aryl)phosphorothioate.

Preferably, the tungsten compound comprises S and P elements, which have a better lubricating effect and show improved drilling processability. The polar atoms, such as S and P, etc., are comprised in the molecules. Affected by metallic surface energy, these components having stronger activity will be affine to the metal surface and firmly adsorbed to the metal surface, which substantively means semi-chemical and semi-physical adsorption to the metal surface. After mechanical movement is carried on, the surface load pressure of rubbed metals increases, and the polar molecules will have a series of complex chemical reactions under special actions of high temperature, high pressure and catalysis in friction environment. The tungsten element in the tungsten compound will reasonably and effectively absorb special elements in the components to form cover film similar to layered anti-friction agents that have a small particle size and a strong adsorption force.

Preferably, the tungsten compound is selected from the group consisting of tungsten disulfide, ammonium tetrathiotungstate, tungsten oxytetrabromide, tungsten tetrachloride, tungsten tetrabromide or amine tungsten alkyl(aryl)phosphorothioate, or a mixture of at least two selected therefrom. The addition of said tungsten compounds into the thermosetting resins will not only improve the drilling processability of the laminates, the compatibility between thermosetting resins and inorganic fillers and the interstratified adhesive force of the laminates to inhibit the deteriorations of the drilling processability and the interstratified adhesive force even if highly-filled with inorganic filler, but also effectively block UV-light and reduce light transmissivity to prepare black copper-clad laminates without any deterioration of insulativity. As compared with black pigments, such as aniline black, said tungsten compounds have better heat resistance, stable physicochemical properties, strong chemical resistance, better dispersibility, no side effect to the reactivity of the thermosetting resins, and are suitable to be the thermosetting resin composition for laminates.

Preferably, the tungsten compound may be in an amount of from about 0.001 to about 30 wt. %, preferably from about 0.1 to about 15 wt. % of the total mass of the thermosetting resin composition. The tungsten compound is in an amount of about, e.g., 1 wt. %, 3 wt. %, 5 wt. %, 7 wt. %, 9 wt. %, 11 wt. %, 13 wt. %, 17 wt. %, 19 wt. %, 21 wt. %, 23 wt. %, 25 wt. %, 27 wt. % or 29 wt. % of the total mass of the thermosetting resin composition. If the amount is lower than about 0.001 wt. % of the total mass of the resin composition, no obvious effect will be produced; if the amount is higher than about 30 wt. % of the total mass of the resin composition, the original whole performance of the resin composition will be affected. When the amount is from about 0.1 to about 15 wt. % of the total mass of the resin composition, the tungsten compound will have the best performance, and the resin composition will have the best dispersibility and fluidity.

Preferably, the inorganic filler may be selected from the group consisting of the group consisting of silica, boehmite, alumina, talc, mica, kaolin, aluminum hydroxide, magnesium hydroxide, zinc borate, zinc stannate, zinc oxide, titania, boron nitride, calcium carbonate, barium sulfate, barium titanate, aluminum borate, potassium titanate, E-glass powder, S-glass powder, D-glass powder, NE-glass powder, hollow micropowder or boehmite, or a mixture of at least two selected therefrom.

The mixture may be selected from the group consisting of, e.g., a mixture of silica and boehmite, a mixture of alumina and talc, a mixture of mica and kaolin, a mixture of aluminum hydroxide and magnesium hydroxide, a mixture of zinc borate and zinc stannate, a mixture of zinc oxide and titania, a mixture of boron nitride and calcium carbonate, a mixture of barium sulfate and barium titanate, a mixture of aluminum borate and potassium titanate, a mixture of E-glass powder and S-glass powder, a mixture of D-glass powder and NE-glass powder, a mixture of hollow micropowder and boehmite, a mixture of silica, boehmite and alumina, a mixture of talc, mica and kaolin, a mixture of aluminum hydroxide, magnesium hydroxide and zinc borate, a mixture of zinc stannate, zinc oxide and titania, a mixture of boron nitride, calcium carbonate and barium sulfate, a mixture of barium titanate, aluminum borate and potassium titanate, a mixture of E-glass powder, S-glass powder and D-glass powder, and a mixture of NE-glass powder, hollow micropowder and boehmite.

Preferably, the inorganic filler may be in an amount of from about 10 to about 80 wt. %, preferably from about 20 to about 60 wt. % of the total mass of the thermosetting resin composition. The amount of the inorganic filler is set to be from about 20 to about 60 wt. % of the total mass of the thermosetting resin composition, which may better maintain the formability and low thermal expansion of the thermosetting resin composition. While highly-filled with the inorganic filler, the thermosetting resin composition employing the technical solution of the present invention may also inhibit the deteriorations of the drilling processability and the interstratified adhesive force. The resultant laminates have low thermal expansion coefficient, excellent drilling processability and heat resistance, high interstratified adhesive force, excellent mechanical performance, and chemical stability.

The inorganic filler is in an amount of about, e.g., 23 wt. %, 28 wt. %, 32 wt. %, 37 wt. %, 42 wt. %, 47 wt. %, 52 wt. %, 57 wt. %, 62 wt. %, 67 wt. %, 72 wt. %, 76 wt. % or 78 wt. % of the total mass of the thermosetting resin composition.

Preferably, the inorganic filler has an average particle size of from about 0.1 to about 100 μm, preferably from about 0.5 to about 20 μm. When the average particle size of inorganic filler is set to be higher than about 0.1 μm, the fluidity inside the highly-filled thermosetting resin composition will be better maintained; when it is below about 100 μm, the interfusion probability of oversize particles will be decreased, and the undesirable occurrence of oversize particles will be inhibited. The average particle size herein refers to the particle size of particles which have about 50% of the volume when the accumulation dimensionality distribution curve based on particle size is determined while the total volume of particles is deemed as about 100%. It can be measured by particle size distribution of the laser diffraction scattering method.

Preferably, the thermosetting resin is in an amount of about 20 to about 70 wt. %, preferably about 25 to about 65 wt. %, further preferably about 30 to about 60 wt. % of the total mass of the thermosetting resin composition. The thermosetting resin is in an amount of about, e.g., 23 wt. %, 26 wt. %, 31 wt. %, 35 wt. %, 39 wt. %, 43 wt. %, 47 wt. %, 51 wt. %, 55 wt. %, 59 wt. %, 63 wt. % or 67 wt. % of the total mass of the thermosetting resin composition.

Preferably, the thermosetting resin composition further comprises a curing agent in an amount of about 1 to about 30 wt. %, preferably about 4 to about 25 wt. %, further preferably about 10 to about 20 wt. % of the total mass of the thermosetting resin composition. The thermosetting resin composition further comprises a curing agent in an amount of about, e.g., 2 wt. %, 5 wt. %, 8 wt. %, 11 wt. %, 14 wt. %, 17 wt. %, 19 wt. %, 22 wt. %, 26 wt. %, or 28 wt. % of the total mass of the thermosetting resin composition.

Preferably, the thermosetting resin composition further comprises an accelerant in an amount of about 0 to about 10 wt. % of the total mass of the thermosetting resin composition, excluding 0, preferably from about 1 to about 10 wt. %, further preferably from about 2 to about 8 wt. %. The accelerant is in an amount of about, e.g., 0.5 wt. %, 1.5 wt. %, 2.5 wt. %, 3.5 wt. %, 4.5 wt. %, 5.5 wt. %, 6.5 wt. %, 7.5 wt. %, 8.5 wt. % ,or 9.5 wt. % of the total mass of the thermosetting resin composition.

Preferably, the thermosetting resin composition further comprises silane coupling agent or/and wetting dispersant. There are no specific definitions to said silane coupling agent as long as they are silane coupling agents used in the treatment of inorganic filler surface, e.g., one selected from the group consisting of aminosilanes such as γ-aminopropyltriethoxysilane, N-β-(aminoethyl)-γ-aminopropyltrimethoxysilane, epoxysilanes such as γ-glycidoxy propyl trimethoxy silane, ethylenesilanes such as γ-methacryloxy propyl trimethoxy silane, anionsilanes such as N-β-(N-vinylbenzoiaminoethyl)-γ-aminopropyltrimethoxysilane hydrochloride, phenylsilanes, or in combination thereof. There will be no special definition if the wetting dispersant is the dispersion stabilizer used in the coatings. The Examples are the wetting dispersants from BYK Chemie Japan, e.g., Disperbyk-110, 111, 180, 161, BYK-W996, W9010, W903, and the like.

The wording "comprise(s)/comprising" in the present invention means that, besides said components, there may be other components which endow the resin composition with different properties. In addition, the wording "comprise(s)/comprising" in the present invention may be replaced with "is/are" or "consist(s) of" in a closed manner. No matter which components the thermosetting resin composition comprises, the sum of the mass percent of each component in the thermosetting composition relative to the thermosetting resin component is 100%.

For example, said thermosetting resin composition may comprise various additives, specifically a flame retardant, an antioxidant, a heat stabilizer, an antistatic agent, an ultraviolet light absorber, a pigment, a colorant or a lubricant. These various additives may be used separately or in combination.

The resin composition of the present invention may be prepared via a well-known process by matching up, stirring, and mixing said thermosetting resin, inorganic filler, tungsten compound, curing agent, and accelerant, as well as various additives.

The second objective of the present invention lies in providing a resin varnish obtained by dissolving or dispersing the aforesaid thermosetting resin composition in a solvent.

The solvent of the present invention is not specifically limited. As specific examples, the solvent may be selected from the group consisting of alcohols such as methanol, ethanol and butanol, ethers such as ethyl cellosolve, butyl cellosolve, glycol-methylether, carbitol and butyl carbitol, ketones such as acetone, butanone, methylethylketone, methylisobutylketone and cyclohexanone, aromatic hydrocarbons such as toluene, xylol and mesitylene, esters such as ethoxyethyl acetate and ethyl acetate, and nitrogen-containing solvents such as N,N-dimethylformamide, N,N-dimethylacetamide, N-methyl-2-pyrrolidone. The aforesaid solvents may be used separately or in combination thereof. Preferably, aromatic hydrocarbons such as toluene, xylol and mesitylene may be mixed with acetone, butanone, methylethylketone, methylisobutylketone and cyclohexanone. Those skilled in the art may choose the amount of the solvents on the basis of their experiences as long as the resultant resin varnish reaches the viscosity to be used.

While the aforesaid resin composition is dissolved or dispersed in the solvent, an emulsifier may be added. The dispersion via an emulsifier may make the filler homogeneously disperse in varnish.

The third objective of the present invention is to provide a prepreg, comprising a reinforcing material and the aforesaid thermosetting resin composition attached thereon after impregnation and drying.

The fourth objective of the present invention is to provide a laminate comprising at least one sheet of the prepreg above.

As compared to the prior art, the present invention has the following beneficial effects.

The addition of tungsten compounds and inorganic fillers into the thermosetting resin of the present invention may not only reduce the thermal expansion coefficient of laminates, increase the mechanical properties of laminates and improve the drilling processability of laminates, but may also prominently improve the compatibility between the thermosetting resin and inorganic filler and the interstratified adhesive force of laminates, so as to inhibit the deteriorations of the drilling processability and the interstratified adhesive force even if highly-filled with inorganic filler. The resultant laminates have low thermal expansion coefficient, excellent drilling processability and heat resistance, high interstratified adhesive force, and excellent mechanical property and chemical stability.

In addition, a certain tungsten compound may be selected to effectively block UV light and reduce light transmissivity and to prepare black copper-clad laminate having excellent heat resistance without any deterioration of insulativity.

EXAMPLES

In order to better explain the present invention and to understand the technical solutions of the present invention, the typical, but non-limitative examples of the present invention are as follows.

Brominated bisphenol A type epoxy resin (Dow Chemical, epoxide equivalent being 435, bromine content being 19%, product name being DER530), dicyandiamide, 2-methylimidazole, tungsten compound and inorganic filler were dissolved in an organic solvent, mechanically stirred and emulsified to formulate 65 wt. % of a varnish. Then glass fiber cloth was impregnated therein, heated and dried to form a prepreg. Copper foils were put to both sides thereof, pressed and heated to produce a copper-clad laminate.

The resultant copper-clad laminate and the following process were used to evaluate the thermal expansion coefficient, UV transmittance, transmissivity, dispersibility effects, volume resistivity and drilling processability, and the results are shown in Table 1.

A) Tungsten compounds

A-1 Tungsten disulfide, Huajing Powdery Material Science& Technology Co., Ltd.

A-2 Ammonium tetrathiotungstate, Haorui Chemical

A-3 Amine tungsten alkyl(aryl)phosphorothioate, Shanghai Dongli Science & Technology Development Co., Ltd.

B) Inorganic fillers

B-1 Molten spherical silica powder, Denka, SFP30M, having an average particle size of 0.5 μm B-2 Molten irregular silica, Sibelco, 525, having an average particle size of 2 μm B-3 Complex silica powder, Sibelco, G2C, having an average particle size of 2 μm B-4 Boehmite, Nabaltec, AOH30

B-5 Boehmite, Nabaltec, AOH60

C) Pigments

C-1 Carbon black powder, Degussa AG, FW200

C-2 Aniline black, Degussa AG, BS890

Comparison Example 1

Except for replacing tungsten compound with carbon black powder, the same process as in Example 1 was used to obtain a copper-clad laminate using the resin composition. The assay and evaluation results are shown in Table 2.

Comparison Example 2

Except for replacing tungsten compound with aniline black, the same process as in Example 1 was used to obtain a copper-clad laminate using the resin composition. The assay and evaluation results are shown in Table 2.

Comparison Example 3

Except for not complexing with tungsten compound, the same process as in Example 1 was used to obtain a copper-clad laminate using the resin composition. The assay and evaluation results are shown in Table 2.

Comparison Example 4

Except for not complexing with tungsten compound, inorganic filler and pigment, the same process as in Example 1 was used to obtain a copper-clad laminate using the resin composition. The assay and evaluation results are shown in Table 2.

1. Assay of Thermal Expansion Coefficient

An etching solution was used to remove copper foils from copper-clad laminates, so as to cut into test pieces having a volume of 5 mm×5 mm. TMA test apparatus was used to determine the average linear thermal expansion rate in the direction of the Z-axis (the direction to which the glass fabric is perpendicular) at 30 to 260° C. and a temperature increasing rate of 10° C./min. The less the thermal expansion rate was, the better the effect was.

2. UV Transmittance

An etching solution was used to remove copper foils from copper-clad laminates, so as to cut into test pieces having a volume of 100 mm×100 mm and to illuminate with 3 kW ultraviolet lamp having a wavelength of 365 nm. The probes of the illuminometer were put on the glass platform of the light source and aligned to ultraviolet light to record the value of the luminometer as shown when the light intensity reached 25 mv/cm$^2$. The blank sample had a value of A, and the test sample had a value of B. The UV transmittance was calculated by the following formula: $\gamma=B/A\times 100\%$. The less the transmittance was, the better the blocking ability against UV was.

3. Transmissivity

Transflective Rate Tester produced by Labsphere, Inc., and the integrating sphere method were used for testing.

4. Evaluation of Bonding Interface Between the Filler and Resin

Laminates were peeled off and cut into a size of 5 mm square, placed on the conducting resin and metal-sprayed to produce viewing test piece. A scanning electron microscope was used to observe the interface between the filler and resin and to evaluate.

5. Evaluation of Dispersion Uniformity of Fillers in the Resin

Laminates were cut into a size of 5 mm square, molded with the resin, placed on the conducting resin and metal-sprayed to produce viewing test piece. A scanning electron microscope was used to observe the dispersion of the resin in the filler and to evaluate.

6. Evaluation of Stability of Resin Compositions 100 ml of the resin composition was placed in a stoppered graduated measuring glass and stood at room temperature of 25° C. to determine the time for the precipitate to detain to the bottom of the settling tube and to evaluate the stability.

7. Assay of Electrical Insulating Property

Laminates were cut into test pieces of 100 mm×100 mm, and to make the surface copper foil into specific patterns. A megger was used on the samples to apply a direct voltage of 500V for 60s, to read the megger after stabilization and to calculate the volume resistivity. The higher the value was, the greater the volume resistivity is, which showed a better electrical insulating property of laminates.

8. Evaluation of Drilling Processability

Two drill spindles having close effects from 6-axis drilling machine were chosen to drill. Each board was drilled for 6 new drilling tools, and each drilling tool was used to drill 3000 holes. Then an inspection microscope was used to observe the cutting edge of the drilling tool, to determine the retract amount after abrasion of the blade tip and to determine the distance between the intersection point of perpendicular line and axle wire and the upper edge of the abrasion as the size of the drilling tool. The following formula was used to calculate the wear rate of the drilling tool and to evaluate the drilling processability.

Wear rate %=distance between the edge and the axle wire after drilling/ distance between the edge and the axle wire before drilling×100%

TABLE 1

| Ingredients/mass parts | Example 1 | Example 2 | Example 3 | Example 4 | Example 5 | Example 6 |
|---|---|---|---|---|---|---|
| DER530 | 100 | 100 | 100 | 100 | 100 | 100 |
| dicyandiamide | 3 | 3 | 3 | 3 | 3 | 3 |
| 2-methylimidazole | 0.05 | 0.05 | 0.05 | 0.05 | 0.05 | 0.05 |
| A) tungsten compound | | | | | | |
| A-1 | 5 | | | | 5 | |
| A-2 | | 10 | | | | 1 |
| A-3 | | | 5 | | 5 | |
| B) Inorganic filler | | | | | | |
| B-1 | 80 | 80 | | | 80 | |
| B-2 | | | 80 | | | |
| B-3 | | | | 80 | | 50 |
| B-4 | | | | | | 30 |
| Assay/evaluation | | | | | | |
| Wear rate of drilling tool/% | 79 | 60 | 70 | 76 | 65 | 66 |
| Thermal expansion coefficient/% | 2.0 | 1.9 | 2.1 | 2.2 | 2.2 | 2.3 |
| UV transmittance/% | 0.02 | 0.01 | 0.03 | 0.02 | 0.03 | 0.05 |
| Transmissivity/% | 0.48 | 0.2 | 0.52 | 0.50 | 0.49 | 0.7 |
| Color | Black | Black | Black | Black | Black | Black |
| Dispersibility | ○ | ○ | ○ | ○ | ○ | ○ |
| Stability/day | 11 | 14 | 16 | 11 | 15 | 11 |
| Volume resistivity/MΩ·cm | 3.94E+6 | 3.47E+6 | 4.3E+6 | 3.89E+6 | 3.56E+6 | 3.85E+6 |

TABLE 2

| Ingredients/mass parts | Comp. Example 1 | Comp. Example 2 | Comp. Example 3 | Comp. Example 4 |
|---|---|---|---|---|
| DER530 | 100 | 100 | 100 | 100 |
| dicyandiamide | 3 | 3 | 3 | 3 |
| 2-methylimidazole | 0.05 | 0.05 | 0.05 | 0.05 |
| Inorganic filler | | | | |
| B-1 | 80 | 80 | 80 | |
| C1 | 5 | | | |
| C2 | | 5 | | |
| Assay/evaluation | | | | |
| Wear rate of drilling tool/% | 94 | 95 | 95 | 45 |
| Thermal expansion coefficient/% | 2.2 | 2.1 | 2.1 | 4.3 |
| UV transmittance/% | 0.03 | 0.03 | 40 | 46 |
| Transmissivity/% | 0.79 | 0.72 | 3.48 | 4.02 |
| Color | black | black | Milk white | Milk white |
| Dispersibility | Δ | Δ | Δ | ○ |
| Stability/day | 3 | 4 | 3 | — |
| Volume resistivity/MΩ·cm | 8.96E+4 | 3.01E+6 | 4.07E+6 | 4.27E+6 |

Notes for Tables 1 and 2: "○" refers to excellence, "Δ" refers to better, "X" refers to worse.

Examples 7-12

100 parts by weight of brominated bisphenol A type epoxy resin (Dow Chemical, epoxide equivalent being 435, bromine content being 19%, product name being DER530), 24 parts by weight of linear phenolic resin (Gun-Ei Chemical, hydroxyl equivalent being 105, product name being TD2090), 0.05 part by weight of 2-methylimidazole and tungsten compound were dissolved in an organic solvent, mechanically stirred and emulsified to formulate 65 wt. % of a varnish. Then glass fiber cloth was impregnated therein, heated and dried to form a prepreg. Copper foils were put to both sides thereof, pressed and heated to produce a copper-clad laminate.

The resultant copper-clad laminate and the following process were used to evaluate the thermal expansion coefficient, UV transmittance, volume resistivity, dispersibility effects and drilling processability as shown in Table 3.

Comparison Example 5

Except for replacing tungsten compound with carbon black powder, the same process as in Example 7 was used to obtain a copper-clad laminate using the resin composition. The assay and evaluation results are shown in Table 4.

Comparison Example 6

Except for replacing tungsten compound with aniline black, the same process as in Example 7 was used to obtain a copper-clad laminate using the resin composition. The assay and evaluation results are shown in Table 4.

Comparison Example 7

Except for not complexing with tungsten compound, the same process as in Example 7 was used to obtain a copper-clad laminate using the resin composition. The assay and evaluation results are shown in Table 4.

Comparison Example 8

Except for not complexing with tungsten compound, inorganic filler and pigment, the same process as in Example 7 was used to obtain a copper-clad laminate using the resin composition. The assay and evaluation results are shown in Table 4.

TABLE 3

| Ingredients/mass parts | Example 7 | Example 8 | Example 9 | Example 10 | Example 11 | Example 12 |
|---|---|---|---|---|---|---|
| DER530 | 100 | 100 | 100 | 100 | 100 | 100 |
| phenolic resin | 24 | 24 | 24 | 24 | 24 | 24 |
| 2-methylimidazole | 0.05 | 0.05 | 0.05 | 0.05 | 0.05 | 0.05 |
| A) tungsten compound | | | | | | |
| A-1 | 10 | | | 3 | | |
| A-2 | | 30 | | | | 0.5 |
| A-3 | | | 3 | | 3 | |
| B) inorganic filler | | | | | | |
| B-1 | 60 | 60 | | | | |
| B-2 | | 60 | | | | |
| B-3 | | | 60 | 60 | | 40 |
| B-5 | | | | | | 20 |
| Assay/evaluation | | | | | | |
| Wear rate of drilling tool/% | 70 | 55 | 65 | 76 | 60 | 80 |
| Thermal expansion coefficient/% | 2.0 | 2.1 | 2.3 | 2.3 | 2.3 | 2.3 |
| UV transmittance/% | 0.03 | 0.01 | 0.03 | 0.02 | 0.04 | 0.06 |
| Transmissivity/% | 0.3 | 0.2 | 0.47 | 0.50 | 0.53 | 0.80 |
| Color | black | black | black | black | black | black |
| Dispersibility | ○ | ○ | ○ | ○ | ○ | ○ |
| Stability/day | 12 | 16 | 14 | 12 | 13 | 12 |
| Volume resistivity/MΩ·cm | 3.85E+6 | 4.03E+6 | 4.1E+6 | 3.95E+6 | 4.2E+6 | 4.35E+6 |

TABLE 4

| Ingredients/mass parts | Comp. Example 1 | Comp. Example 2 | Comp. Example 3 | Comp. Example 4 |
|---|---|---|---|---|
| DER530 | 100 | 100 | 100 | 100 |
| phenolic resin | 24 | 24 | 24 | 24 |
| 2-methylimidazole | 0.05 | 0.05 | 0.05 | 0.05 |
| Inorganic filler | | | | |
| B-1 | 60 | 60 | 60 | |
| C1 | 3 | | | |
| C2 | | 3 | | |
| Assay/evaluation | | | | |
| Wear rate of drilling tool/% | 93 | 95 | 96 | 49 |
| Thermal expansion coefficient/% | 2.1 | 2.1 | 2.2 | 4.6 |
| UV transmittance/% | 0.04 | 0.03 | 38 | 43 |
| Transmissivity/% | 0.83 | 0.75 | 3.08 | 3.78 |
| Color | black | black | Milk white | Milk white |
| Dispersibility | Δ | Δ | Δ | ○ |
| Stability/day | 4 | 3 | 5 | — |
| Volume resistivity/MΩ·cm | 9.3E+4 | 3.67E+6 | 4.29E+6 | 4.26E+6 |

Notes for Tables 3 and 4: "○" refers to excellence, "Δ" refers to better, "X" refers to worse.

It can be seen from Tables 1-4 that the addition of tungsten compounds into the thermosetting resin composition cured with DICY or phenolic resin may not only improve the drilling processability of laminates, but also effectively block UV-light and decrease light transmittance. The addition of a small amount of tungsten compounds may decrease the UV transmissivity of laminates from about 35 to about 46% to about 0.01 to about 0.6%, and the light transmittance from about 3 to about 4% to about 0.1 to about 0.8%. It has notable effects and excellent overall performance. In addition, it can be seen from Tables 1-4 that the dispersibility and stability of the resin composition into which tungsten compound is added are notably superior to those of the resin composition into which tungsten compound is not added. According to Comparison Examples 4 and 8, it can be seen that the thermal expansion coefficient is increased since no inorganic filler is added to the composition. Thus the addition of inorganic fillers may decrease the thermal expansion coefficient of the composite materials. As compared to Comparison Examples 3 and 7, it may be seen that inorganic fillers also have synergistic effects on blocking and on improving for UV transmittance and transmissivity. As for Comparison Examples 1 and 5, the electrical insulating properties thereof are degraded due to the existence of carbon black powder.

The applicant declares that, the present invention detailedly discloses the process of the present invention by the aforesaid examples, but the present invention is not limited by the detailed process, i.e., it does not mean that the present invention cannot be fulfilled unless the aforesaid detailed process is used. Those skilled in the art shall know that, any amendment, equivalent change to the product materials of the present invention, addition of auxiliary ingredients, and selection of any specific modes all fall within the protection scope and disclosure scope of the present invention.

The invention claimed is:

1. A thermosetting resin composition, wherein the thermosetting resin composition comprises a thermosetting resin, an inorganic filler and a tungsten compound, wherein the tungsten compound comprises S and P elements.

2. The thermosetting resin composition of claim 1, wherein the tungsten compound is selected from the group consisting of an organic tungsten compound, an inorganic tungsten compound, and a combination of organic tungsten compounds and inorganic tungsten compounds.

3. The thermosetting resin composition of claim 1, wherein the tungsten compound is selected from the group consisting of amine tungsten diisopropyl phosphorodithioate, amine tungsten alkyl(aryl)phosphorothioate, and a combination of amine tungsten diisopropyl phosphorodithioate and amine tungsten alkyl(aryl)phosphorothioate.

4. The thermosetting resin composition of claim 1, wherein the tungsten compound is in an amount of from about 0.001 to about 30 wt. % of the total mass of the thermosetting resin composition.

5. The thermosetting resin composition of claim 4, wherein the tungsten compound is in an amount of from about 0.1 to about 15 wt. % of the total mass of the thermosetting resin composition.

6. The thermosetting resin composition of claim 1, wherein the inorganic filler is selected from the group consisting of silica, boehmite, alumina, talc, mica, kaolin, aluminum hydroxide, magnesium hydroxide, zinc borate, zinc stannate, zinc oxide, titania, boron nitride, calcium carbonate, barium sulfate, barium titanate, aluminum borate, potassium titanate, E-glass powder, S-glass powder, D-glass powder, NE-glass powder, hollow micropowder and boehmite, and a combination of at least two selected therefrom.

7. The thermosetting resin composition of claim 1, wherein the inorganic filler is in an amount of from about 10 to about 80 wt. % of the total mass of the thermosetting resin composition.

8. The thermosetting resin composition of claim 7, wherein the inorganic filler is in an amount of from about 20 to about 60 wt. % of the total mass of the thermosetting resin composition.

9. The thermosetting resin composition of claim 1, wherein the inorganic filler has an average particle size of from about 0.1 to about 100 μm.

10. The thermosetting resin composition of claim 1, wherein the inorganic filler has an average particle size of from about 0.5 to about 20 μm.

11. The thermosetting resin composition of claim 1, wherein the thermosetting resin is in an amount of from about 20 to about 70 wt. % of the total mass of the thermosetting resin composition.

12. The thermosetting resin composition of claim 11, wherein the thermosetting resin is in an amount of from about 25 to about 65 wt. % of the total mass of the thermosetting resin composition.

13. The thermosetting resin composition of claim 1, wherein the thermosetting resin composition further comprises a curing agent in an amount of from about 1 to about 30 wt. % of the total mass of the thermosetting resin composition.

14. The thermosetting resin composition of claim 13, wherein the curing agent is in an amount of from about 4 to about 25 wt. % of the total mass of the thermosetting resin composition.

15. The thermosetting resin composition of claim 1, wherein the thermosetting resin composition further comprises an accelerant in an amount of from about 0 to about 10 wt. % of the total mass of the thermosetting resin composition, excluding 0 wt. %.

16. The thermosetting resin composition of claim 15, wherein the accelerant is in an amount of from about 1 to about 10 wt. % of the total mass of the thermosetting resin composition.

17. A resin varnish, wherein the resin varnish is obtained by dissolving or dispersing the thermosetting resin composition of claim 1 in a solvent.

18. A prepreg comprising a reinforcing material and a thermosetting resin composition of claim 1 attached on the reinforcing material after impregnation and drying.

19. A laminate comprising at least one prepreg of claim 18.

* * * * *